April 18, 1933.  E. L. RUPF  1,903,922
LOCK NUT AND METHOD OF MANUFACTURE
Original Filed Feb. 8, 1932
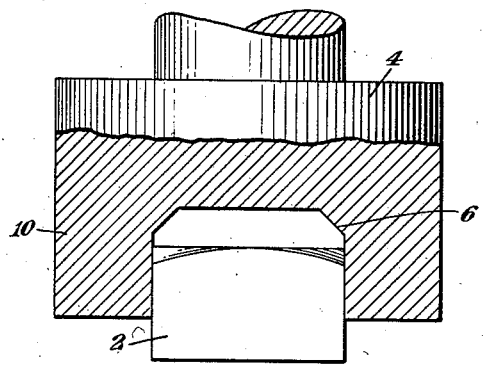
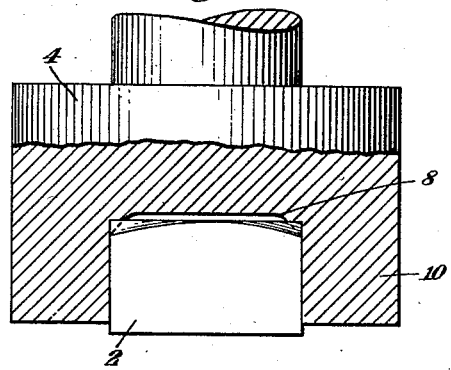
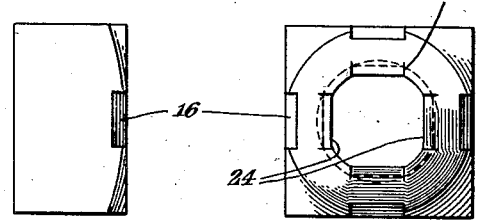
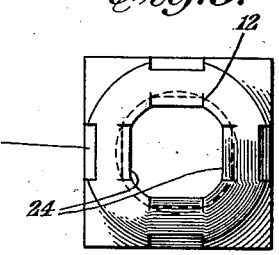
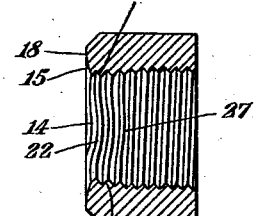
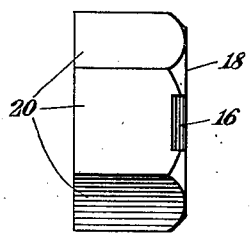
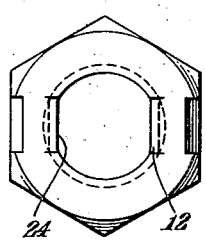
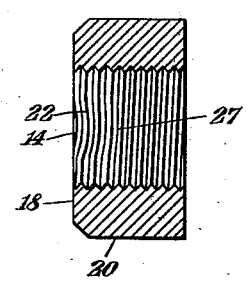
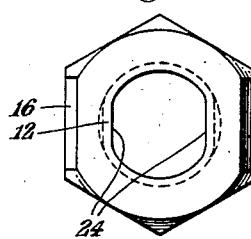
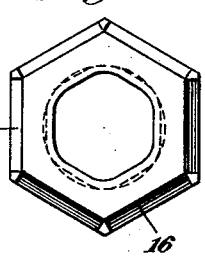
INVENTOR
Ernest L. Rupf.

Patented Apr. 18, 1933

1,903,922

UNITED STATES PATENT OFFICE

ERNEST L. RUPF, OF WEST NEW BRIGHTON, NEW YORK

LOCK NUT AND METHOD OF MANUFACTURE

Original application filed February 8, 1932, Serial No. 591,583. Divided and this application filed June 15, 1932. Serial No. 617,276.

This invention relates to a locking or gripping nut and to a method of manufacturing same.

This is a division of my copending application Serial No. 591,583, filed Feb. 8, 1932.

The prior art contains disclosures of numerous lock nuts which however are not in general use because of various manufacturing difficulties, constructional faults and defects which prevent their adaptability for all kinds of work.

The nut and method of manufacturing same which are the subject of my invention, lend themselves readily to low cost quantity production and are extremely efficient for their respective purposes. The nut is only slightly different in appearance from the standard nut and has the full strength of the standard nut, not being weakened by slits, grooves or under cuts. The nut can be used wherever a standard nut is usable, can be taken off and on a reasonable number of times without losing its locking ability, does not injure its own threads or the threads of the bolt and yet is efficient in its locking action, and can be manufactured from a standard nut by a single pressing or stamping operation.

These and other features of the invention will in part be obvious and in part will more fully appear from the following description and the accompanying drawing which, however, must be considered as merely illustrating one form of the invention and in no way limiting it to the embodiment shown and described.

In the drawing:

Fig. 1 illustrates the method of treating a standard nut to make a lock nut.

Fig. 2 also illustrates the method showing the parts in a more advanced position and using a slightly different die.

Figs. 3 to 6 inclusive are different sectional and face views of various forms of lock nuts.

In carrying out my invention I may and prefer to, start with a standard nut 2 which may have any of the usual shapes, holes or threads. Square and hexagonal nuts are illustrated but other forms may be used.

This nut is placed under a die or tool 4 having a bevelled portion 6 or an arcuate portion 8 which causes a flow of the metal at the contacting portion of the nut when the two are forced together. The tool 4 may and preferably does, have a skirt or nut-body-supporting portion 10 which engages the sides of the nut to prevent the metal from flowing outwardly. When the die and the nut are brought into pressure contact, the metal of the nut flows away from the die that is, both inwardly at 12 toward the axis of the nut and along the hole at 14 parallel to the axis in the direction of movement of the die, giving a slight depression at 15 in the lateral face of the nut. The die presses a chamfer or bevel 16 which lies at an angle to the lateral face 18 and a longitudinal face 20.

As a result of the metal movement, the threads are given a slight wave 22 and the hole is somewhat flattened at 24 opposite the points where the die and nut contact. The waved portions of the threads that is, the portion of the surface of the hole which is distorted tapers at 26 from the lateral surface 18 toward the original diameter and circular form of wall. It will be noted particularly by reference to Figs. 3b and 3c that not only are the threads waved and flattened by the pressing operation, but there is likewise a rolling over or angular displacement of the threads themselves, which may be referred to as a protrusion effect, whereby the rolled over threads will be caused to grip the threads of the bolt with a firm fit whereby accidental removal of the nut is avoided. When the bolt is screwed into the nut there is a gradual locking effect due both to the wave of the threads and the protrusion of the parts, but neither the thread-wave nor the flattening effect nor the protrusion effect is sufficient to damage the threads of the bolt.

By this method of treating the nut by the die parts 6 or 8 and using the skirt 10 of the die where necessary to prevent general distortion of the nut the above effects are obtained, but the hole itself is not made oval in shape and thus there are no ends which are spread away from the threads of the bolts. All threads on the bolt and nut fit as closely as they would on a standard nut. The distortion of the threads and of the hole is barely perceptible. The nut is not weakened by the operation nor are the outer faces distorted to such an extent that a wrench will be unusually loose or tight when applied to the nut in any position.

The angle of the bevelled portion 6 of the die may vary considerably but is preferably from 35° to 50° against the axis of the nut. These angles have been found to give a good correlation of thread wave, protrusion and hole flattening thus utilizing in combination the resilience of the threads of both the nut and bolt as well as the binding action of the flattened hole. By regulating the angle for displacing the metal and the depth of pressing, the nut can be made to bind for only a small fraction of the threads or for the entire depth of the nut, or to a point 27 approximately half way down the nut. It is considered preferable to have the die contact with the top of the nut. Thus the threads at the bottom of the nut are not distorted and the nut starts easily on the bolt.

Several advantages are obtained by having the die move along the axis of the nut to compress the nut longitudinally instead of laterally. One advantageous feature is that the hole is distorted only slightly. The nut of course has less lateral strength than longitudinal strength and if the nut is compressed from the sides the tendency is for the hole to flatten and leave the threads at their usual angle, but if the die is bevelled and the motion is along the axis, the wave is put in the threads and there is less flattening of the hole although the amount of each can be regulated as previously described.

Another advantage is that by exerting the force longitudinally of the nut, a single and very simple and inexpensive die may be used and the nut may be treated by a single operation. The die may easily be made to compress one or any number of the faces, either entirely across as is shown in Figs. 5 and 6, or only part way across as is shown in Figs. 3 and 4.

Although a form of nut and method of manufacture have been described in detail, indications of several other forms have also been made. It is recognized that the invention may be applied to still other forms of nuts and it is therefore desired that the invention be construed as broadly as the claims taken in conjunction with the prior art, may allow.

I claim:

1. The method of converting a standard nut into a lock nut which comprises displacing the metal at the periphery of the hole, both inwardly toward the axis of the nut and longitudinally of the nut by pressing a bevel on a side of a lateral face of the nut opposite the portion to be displaced.

2. A method as set forth in claim 1 wherein the pressing operation takes place simultaneously on a plurality of sides of the lateral face.

3. A method as set forth in claim 1 wherein the pressing operation is performed on opposite sides of the lateral face to displace the metal at the periphery of the hole on opposite sides thereof.

4. The method as set forth in claim 1 wherein the bevel formed makes an angle of from substantially 35° to substantially 50° with the longitudinal axis of the nut.

5. The method as set forth in claim 1 wherein a portion of the thread of the nut is partially rolled over during the displacing of the metal at the periphery of the hole.

6. The method as set forth in claim 1 wherein the metal of the outer longitudinal face of the nut adjacent the bevel is retained against expansion during the pressing operation.

In testimony whereof, I affix my signature.

ERNEST L. RUPF.